United States Patent
Kuroki et al.

(10) Patent No.: US 9,769,341 B2
(45) Date of Patent: Sep. 19, 2017

(54) IMAGE FORMING APPARATUS

(71) Applicant: KYOCERA Document Solutions Inc., Osaka-shi, Osaka (JP)

(72) Inventors: Hirofumi Kuroki, Osaka (JP); Takashi Tamura, Osaka (JP); Hajime Sejima, Osaka (JP); Mikiya Kitagawa, Osaka (JP)

(73) Assignee: KYOCERA Document Solutions Inc., Osaka-shi, Osaka (JP)

( * ) Notice: Subject to any disclaimer, the term of this patent is extended or adjusted under 35 U.S.C. 154(b) by 0 days.

(21) Appl. No.: 15/300,251

(22) PCT Filed: Mar. 23, 2016

(86) PCT No.: PCT/JP2016/059182
§ 371 (c)(1),
(2) Date: Sep. 28, 2016

(87) PCT Pub. No.: WO2016/163233
PCT Pub. Date: Oct. 13, 2016

(65) Prior Publication Data
US 2017/0180573 A1 Jun. 22, 2017

(30) Foreign Application Priority Data
Apr. 6, 2015 (JP) ................. 2015-077557

(51) Int. Cl.
*G03G 15/00* (2006.01)
*H04N 1/00* (2006.01)

(52) U.S. Cl.
CPC ....... *H04N 1/00559* (2013.01); *H04N 1/0032* (2013.01); *H04N 1/00339* (2013.01); *H04N 1/00551* (2013.01); *H04N 2201/0094* (2013.01)

(58) Field of Classification Search
USPC ...... 399/75, 79–81, 107, 108, 113, 114, 405
See application file for complete search history.

(56) References Cited

U.S. PATENT DOCUMENTS

| | | | | |
|---|---|---|---|---|
| 7,758,182 B2 * | 7/2010 | Yonekawa | ............... | B41J 29/13 347/108 |
| 2008/0286002 A1 * | 11/2008 | Akiyama | ........... | G03G 21/1633 399/114 |
| 2011/0013930 A1 | 1/2011 | Nishida et al. | | |

FOREIGN PATENT DOCUMENTS

| | | |
|---|---|---|
| JP | 2005151367 A | 6/2005 |
| JP | 2014202911 A | 10/2014 |

OTHER PUBLICATIONS

European Patent Office, Extended European Search Report Issued in Application No. 16767125.4, May 19, 2017, Germany, 7 pages.

* cited by examiner

*Primary Examiner* — Hoan Tran
(74) *Attorney, Agent, or Firm* — Alleman Hall Creasman & Tuttle LLP

(57) ABSTRACT

An image forming apparatus (100) includes an image reading portion (2), an image forming portion (3), an in-body discharge portion (7), an information reading portion (6), a reading cover (61), and an operation portion (5). The information reading portion (6) is stored in a front of the image reading portion (2) and reads information of a user. The reading cover (61) covers the information reading portion (6). A first area including surfaces of the reading cover (61) and the operation portion (5) and a second area including surfaces of the image reading portion (2), the image forming portion (3), and the in-body discharge portion (7) are substantially different in outer appearance.

10 Claims, 1 Drawing Sheet

IMAGE FORMING APPARATUS

TECHNICAL FIELD

The present invention relates to an image forming apparatus including, for example, a card reader for reading information from an IC card.

BACKGROUND ART

An IC reader that can read information of a user from an IC card may be mounted on an image forming apparatus such as a multifunction peripheral. In addition, the IC reader may be stored in the front of an exterior member of the image forming apparatus (see PTL 1, for example). It is noted that a cover is attached to the front side of the IC reader to cover the IC reader.

CITATION LIST

Patent Literature

[PTL 1] Japanese Patent Application Publication No. 2014-202911

SUMMARY OF THE INVENTION

Problems to be Solved by the Invention

Meanwhile, the user of an image forming apparatus of this type first causes the IC reader to read an IC card of himself/herself, and then performs an operation on an operation portion provided on the image forming apparatus. In this way, at the start of using the image forming apparatus, the user needs to perform a predetermined sequence of operations. In such a case, however, the line of sight of the user tends to be oriented toward the operation portion that is noticeable, and the user must search for the location of the IC reader because he/she needs to perform an operation of holding the IC card over the IC reader.

The present invention has been made in view of such conventional circumstances, and it is an object of the present invention to provide an image forming apparatus that can guide the line of sight of the user naturally to a place where an operation is required.

Solution to the Problems

An image forming apparatus according to an aspect of the present invention includes an image reading portion, an image forming portion, an in-body discharge portion, an information reading portion, a reading cover, and an operation portion. The image reading portion reads an image from a document sheet. The image forming portion is disposed below the image reading portion and forms an image on a sheet. The in-body discharge portion is disposed between the image reading portion and the image forming portion and to which the sheet is discharged after the image is formed on the sheet by the image forming portion. The information reading portion is stored in a front of the image reading portion and reads information of a user. The reading cover covers the information reading portion. The operation portion receives a user operation. A first area including surfaces of the reading cover and the operation portion and a second area including surfaces of the image reading portion, the image forming portion, and the in-body discharge portion are substantially different in outer appearance.

Advantageous Effects of the Invention

According to the present invention, it is possible to provide an image forming apparatus that can guide the line of sight of the user naturally to a place where an operation is required.

DESCRIPTION OF EMBODIMENTS

Figure 1:
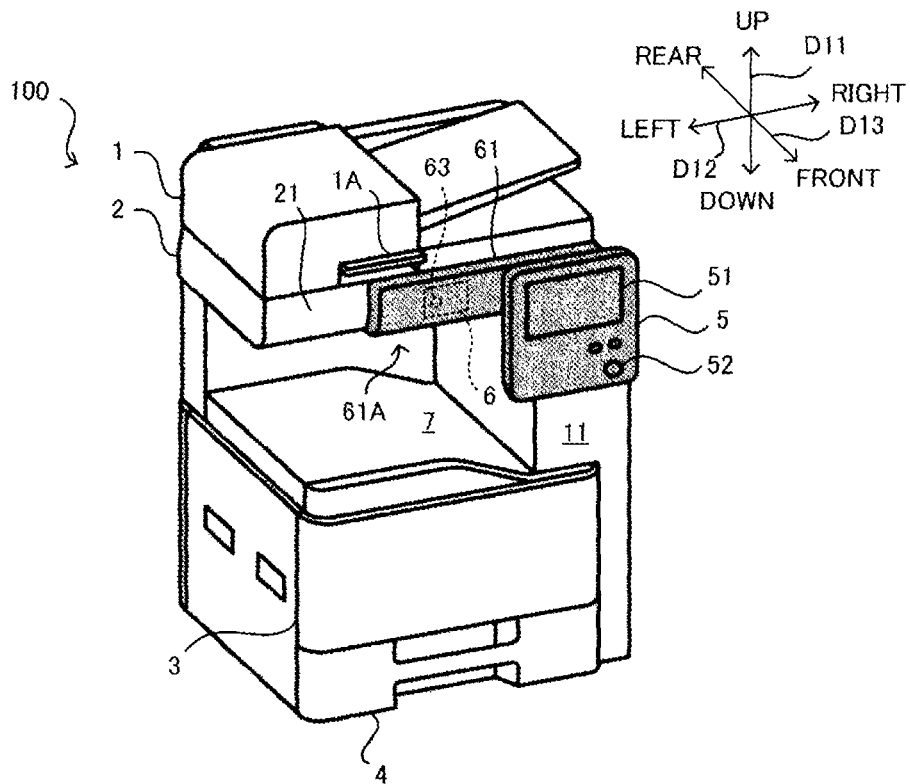
FIG. 1 is a perspective view of an image forming apparatus according to an embodiment of the present invention.

The following describes an embodiment of the present invention with reference to the accompanying drawings for the understanding of the invention. It should be noted that the following embodiment is an example of a specific embodiment of the present invention and should not limit the technical scope of the present invention.

[Outlined Configuration of Image Forming Apparatus 100]

An outlined configuration of an image forming apparatus 100 according to an embodiment of the present invention is described with reference to FIG. 1. It is noted that in the following, an up-down direction D11, a left-right direction D12, and a front-rear direction D13 shown in the drawings may be used for the sake of explanation.

The image forming apparatus 100 includes an ADF 1, an image reading portion 2, an image forming portion 3, a sheet feed cassette 4, an operation portion 5, an IC reader 6, and an in-body discharge portion 7. The image forming apparatus 100 is a multifunction peripheral having a plurality of functions such as a scan function, a print function, a facsimile function, and a copy function.

The ADF 1 is an automatic document sheet feeding device including a document sheet setting portion, a feeding roller, a document sheet pressing, and a sheet discharge portion, and feeds a document sheet that is to be read by the image reading portion 2. The image reading portion 2 includes a document sheet table, a light source, a mirror, an optical lens, and a CCD (Charge Coupled Device), reads an image from the document sheet, and outputs the read image as image data. The ADF 1 can be opened and closed with respect to the image reading portion 2, and is provided with a gripping portion 1A that is used by the user to open and close the ADF 1.

In addition, a front cover 21 and an IC cover 61 are attached to the front side of the image reading portion 2 in a detachable manner. The front cover 21 is removed when an option unit, such as a keyboard mounting portion, is attached to the front of the image reading portion 2. The IC cover 61 covers the front side of the IC reader 6, and is attached and detached when the IC reader 6 is attached to the front of the image reading portion 2.

The image forming portion 3 is an electrophotographic image forming portion that forms an image on a sheet supplied from the sheet feed cassette 4 which stores sheets, based on image data read by the image reading portion 2, or image data input from an external information processing apparatus. Specifically, the image forming portion 3 includes a photoconductor drum, a charging device, a laser scanning unit (LSU), a developing device, a transfer roller, a cleaning device, and a fixing roller.

The image forming portion 3 is disposed below the image reading portion 2. The in-body discharge portion 7 is disposed between the image reading portion 2 and the image forming portion 3 in the vertical direction. After an image is formed on a sheet by the image forming portion 3, the sheet is discharged to the in-body discharge portion 7.

The operation portion 5 includes a touch panel 51 and a hard key 52, wherein the touch panel 51 displays various types of information such as an operation screen and receives user operations, and the hard key 52 is, for example, a start key. The operation portion 5 is pivotably supported by a support housing 11 of the image forming apparatus 100. For example, the operation portion 5 is configured to pivot between a first attitude (see FIG. 1 and FIG. 2) and a second attitude (not shown), wherein in the first attitude, the surface of the operation portion 5 (the surface of the touch panel 51) is parallel to a vertical plane, and in the second attitude, the surface of the operation portion 5 is parallel to a horizontal plane. In addition, the operation portion 5 can keep its attitude at an arbitrary position between the first attitude and the second attitude.

It is noted that the first attitude and the second attitude are not limited to those described above. For example, the first attitude may be a state in which the surface of the operation portion 5 is slightly inclined with respect to a vertical plane, or a state in which the surface of the operation portion 5 is inclined by approximately 15 degrees with respect to a vertical plane. Similarly, the second attitude may be a state in which the surface of the operation portion 5 is slightly inclined with respect to a horizontal plane, or a state in which the surface of the operation portion 5 is inclined by approximately 15 degrees with respect to a horizontal plane.

[IC Reader 6]

The IC reader 6 is stored in the front of the image reading portion 2. The front side of the IC reader 6 is covered by the IC cover 61 that is translucent. The IC reader 6 can read information of a user by a non-contact communication from an IC card carried by the user. Specifically, the user stands in front of the image forming apparatus 100, causes the IC reader 6 to read an IC card that the user carries, logs in the image forming apparatus 100, and starts using the image forming apparatus 100. The IC reader 6 is an example of the information reading portion. The IC cover 61 is an example of the reading cover. The IC card is an example of the recording medium. As another embodiment, an information reading portion such as a fingerprint reading portion may be provided in place of the IC reader 6.

The IC cover 61 is longer than the operation portion 5 in the left-right direction, and the length of the IC cover 61 in the left-right direction is equal to or greater than a half of the length of the image forming apparatus 100 in the left-right direction. With this configuration, the IC cover 61 occupies a large area in the outer appearance of the image forming apparatus 100. Thus the user can easily recognize the presence of the IC cover 61, enabling the line of sight of the user to be guided to a place where an operation is required. In addition, since an enough length of the IC cover 61 in the left-right direction is ensured, options for the IC reader 6 that can be stored in the front of the image reading portion 2 are increased.

Figure 2:
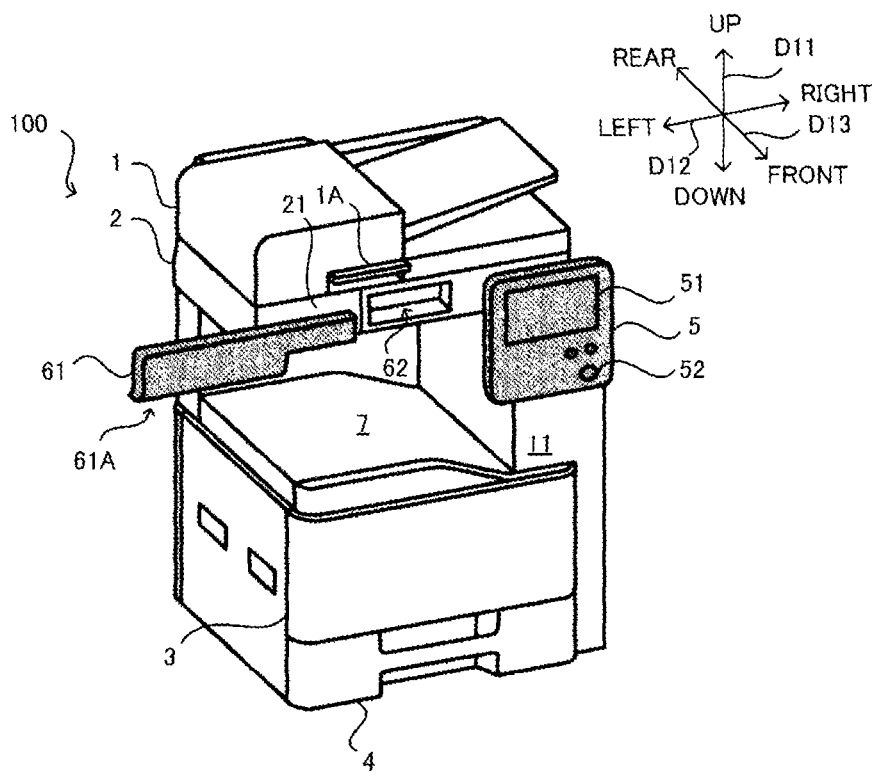
FIG. 2 is a perspective view of the image forming apparatus according to the embodiment of the present invention.

Here, FIG. 2 is a perspective view of the image forming apparatus 100 in a state where the IC cover 61 and the IC reader 6 have been removed therefrom. As shown in FIG. 2, an IC holder 62 is formed in the front of the image reading portion 2, and the IC reader 6 is held by the IC holder 62. The IC reader 6 and the IC holder 62 are hidden by the IC cover 61 when the IC cover 61 is attached to the image reading portion 2.

In addition, the IC reader 6 includes a lighting portion 63, such as an LED, that is used to display an operation state or the like of the IC reader 6. The lighting portion 63 lights green when information reading from an IC card by the IC reader 6 was performed normally, and lights red when information reading from an IC card by the IC reader 6 was not performed normally. On the other hand, the IC cover 61 is a translucent smoke cover of gray, black or the like, and the lighting state of the lighting portion 63 can be visually recognized from outside through the IC cover 61.

The IC cover 61 is an elongated member extending from the right end portion of the image reading portion 2, through an area corresponding to the rear side of the operation portion 5, to a position so as to cover a predetermined amount of the front side of the front cover 21. That is, the IC cover 61 includes, in the front side of the image reading portion 2, an area that covers a location at which the IC reader 6 is disposed, and an area corresponding to the rear side of the operation portion 5. This makes it possible to reduce the components in number compared to a case of providing, for example, the front cover 21, a cover that covers a location in the front side of the image reading portion 2 at which the IC reader 6 is located, and a cover that covers an area in the front side of the image reading portion 2 that corresponds to the rear side of the operation portion 5, individually.

In the state where the IC cover 61 is attached to the image reading portion 2, the surface of the IC cover 61 projects more frontward of the image forming apparatus 100 than the other areas in the front side of the image reading portion 2 (in the surface of the front cover 21). With this configuration, the IC cover 61 is most noticeable in the front side of the image reading portion 2, and the user can easily grasp the area in which the IC reader 6 is disposed.

In addition, a corner portion 61A that is a lower-end portion of the front side of the IC cover 61 is chamfered. This reduces an area blocked by the corner portion 61A of the IC cover 61 when the user sees the inside of the in-body discharge portion 7 from the front side of the image forming apparatus 100, and the user can easily see a sheet discharged onto the in-body discharge portion 7. In addition, this configuration reduces the risk of the user's hand contacting the lower end of the IC cover 61 when the user takes out a sheet from the in-body discharge portion 7. It is noted that the chamfered corner portion 61A is not limited to a curved surface, but may be a polygonal surface. Furthermore, the corner portion 61A may be tapered.

The IC cover 61 is disposed in proximity to a position directly below the gripping portion 1A of the ADF 1. Specifically, in a plan view of the image forming apparatus 100, the gripping portion 1A is adjacent to the IC cover 61 in the front-rear direction, and at least a part of the gripping portion 1A is within a range of the IC cover 61 in the left-right direction. Furthermore, in a front view of the image forming apparatus 100, the gripping portion 1A is adjacent to the IC cover 61 in the up-down direction. As a result, when the line of sight of the user is oriented toward the IC cover 61, the gripping portion 1A comes into the user's field of vision. With this configuration, when the user starts, for example, a copy job or a facsimile job that uses the scan function and operates the IC reader 6, it is possible to guide the line of sight of the user naturally to the gripping portion 1A that is required to be operated thereafter.

Meanwhile, as described above, the user of the image forming apparatus 100, after causing the IC reader 6 to read the IC card of himself/herself, performs an operation on the operation portion 5 provided on the image forming apparatus 100. In this way, at the start of using the image forming apparatus, the user needs to perform a predetermined sequence of operations. In such a case, however, the line of sight of the user tends to be oriented toward the operation portion 5 that is noticeable, and the user must search for the location of the IC reader because he/she needs to perform an operation of holding the IC card over the IC reader. In view of this, according to the image forming apparatus 100, the outer appearance configuration enables the line of sight of the user to be naturally guided to a place where an operation is required.

[Outer Appearance Configuration of Image Forming Apparatus 100]

As shown in FIG. 1 and FIG. 2, in the image forming apparatus 100, a first area including the surfaces of the IC cover 61 and the operation portion 5 and a second area including the surfaces of the ADF 1, the image reading portion 2, the image forming portion 3, and the in-body discharge portion 7 are substantially different in outer appearance. This allows the line of sight of the user to be guided not only to the operation portion 5 that is noticeable, but also to the IC cover 61 that has substantially the same outer appearance as the operation portion 5. As a result, the line of sight of the user is naturally guided to a place in the image forming apparatus 100 where an operation is required. It is noted that the IC cover 61 and the operation portion 5 overlap at least partially in the up-down direction D11 and the left-right direction D12 in a front view of the image forming apparatus 100 so as to give a sense of unity of the IC cover 61 and the operation portion 5.

Specifically, the first area and the second area are different in brightness. The IC cover 61 in the first area is a smoke cover formed from resin of low brightness such as gray or black. Similarly, the surface of the operation portion 5 in the first area is formed from resin of low brightness such as gray or black. On the other hand, the surfaces of the ADF 1, the image reading portion 2, the image forming portion 3, and the in-body discharge portion 7 in the second area are formed from resin of high brightness such as gray or whitish color. It is noted that as far as there is a difference in brightness between the first area and the second area, the present invention is not limited to the above-described configuration.

In addition, the first area and the second area are different in surface treatment, as well. The IC cover 61 and the operation portion 5 in the first area are processed to have glossy surfaces. On the other hand, the ADF 1, the image reading portion 2, the image forming portion 3, and the in-body discharge portion 7 in the second area are processed to have embossed surfaces such as crepe surfaces or matte surfaces. It is noted that the present invention is not limited to the above-described configuration as far as there is a difference in surface treatment between the first area and the second area so that the user can recognize a difference in texture.

As described above, in the image forming apparatus 100, the first area and the second area are substantially different in the outer appearance, allowing the user to easily distinguish the first area from the second area. As a result, when starting to operate the image forming apparatus 100, the line of sight of the user is also oriented toward the IC cover 61 that is, together with the operation portion 5, included in the first area. Accordingly, in the image forming apparatus 100, it is possible to naturally urge the user to perform a sequence of operations of operating the IC reader 6 in the IC cover 61 and the operation portion 5 that are adjacent in the left-right direction D12. In particular, in the image forming apparatus 100, the surface of the exterior member other than the first area and the second area may be processed to have the same outer appearance as the second area. This causes the line of sight of the user to be naturally oriented to the first area that is different from the other areas in the outer appearance.

It is noted that in the present embodiment, a description was given by using an example case where the differences between the first area and the second area are the brightness and the surface treatment. However, the configuration of the present invention is not limited to this. Specifically, it suffices that the first area and the second area are visually distinguishable from each other by being different in at least one of surface treatment, hue, saturation, and brightness.

Furthermore, as far as the first area and the second area are visually distinguishable from each other, the surfaces of all components included in the first area may not necessarily be the same in outer appearance. Similarly, the surfaces of all components included in the second area may not necessarily be the same in outer appearance. For example, the surfaces of the IC cover 61 and the operation portion 5 included in the first area may be the same in brightness, but different in surface treatment.

The invention claimed is:

1. An image forming apparatus comprising:
   an image reading portion configured to read an image from a document sheet;
   an image forming portion disposed below the image reading portion and configured to form an image on a sheet;
   an in-body discharge portion disposed between the image reading portion and the image forming portion and to which the sheet is discharged after the image is formed on the sheet by the image forming portion;
   an information reading portion stored in a front of the image reading portion and configured to read information of a user;
   a reading cover configured to cover the information reading portion; and
   an operation portion configured to receive a user operation, wherein
   a first area including surfaces of the reading cover and the operation portion and a second area including surfaces of the image reading portion, the image forming portion, and the in-body discharge portion are substantially different in outer appearance.

2. The image forming apparatus according to claim 1, wherein
   the first area and the second area are different in surface treatment.

3. The image forming apparatus according to claim 1, wherein
   the first area and the second area are different in at least one of hue, saturation, and brightness.

4. The image forming apparatus according to claim 1, wherein
   the reading cover is longer than the operation portion in a width direction.

5. The image forming apparatus according to claim 1, wherein
   a length of the reading cover in a width direction is equal to or greater than a half of a length of the image forming apparatus in the width direction.

6. The image forming apparatus according to claim 1, wherein
the reading cover is an elongated member including an area that covers a location in a front side of the image reading portion at which the information reading portion is disposed, and an area corresponding to a rear side of the operation portion.

7. The image forming apparatus according to claim 1, wherein
a surface of the reading cover projects more frontward of the image forming apparatus than other areas in a front side of the image reading portion.

8. The image forming apparatus according to claim 1, further comprising:
an automatic feeding device disposed above the image reading portion and configured to feed a document sheet that is to be read by the image reading portion, wherein
a surface of the automatic feeding device is included in the second area.

9. The image forming apparatus according to claim 8, wherein
the automatic feeding device can be opened and closed with respect to the image reading portion, and is provided with a gripping portion used to open and close the automatic feeding device, and
the reading cover and the gripping portion are provided in proximity to each other.

10. The image forming apparatus according to claim 1, wherein
the information reading portion can read information from a recording medium by a non-contact communication.

* * * * *